I. A. WILLIAMS.

Locomotive Headlight.

No. 503.

Reissued Oct. 27, 1857.

N. PETERS, Photo-Lithographer, Washington, D. C.

UNITED STATES PATENT OFFICE.

IRVIN A. WILLIAMS, OF UTICA, NEW YORK.

IMPROVED LOCOMOTIVE-LAMP.

Specification forming part of Letters Patent No. 11,799, dated October 10, 1854; Reissue No. 503, dated October 27, 1857.

*To all whom it may concern:*

Be it known that I, IRVIN A. WILLIAMS, of Utica, in the county of Oneida and State of New York, have invented a new and useful Improvement in Locomotive-Lamps; and I do hereby declare that the following is a full, clear, and exact description of the construction and operation of the same, reference being had to the annexed drawings, forming part of this specification, in which—

Figure 1:
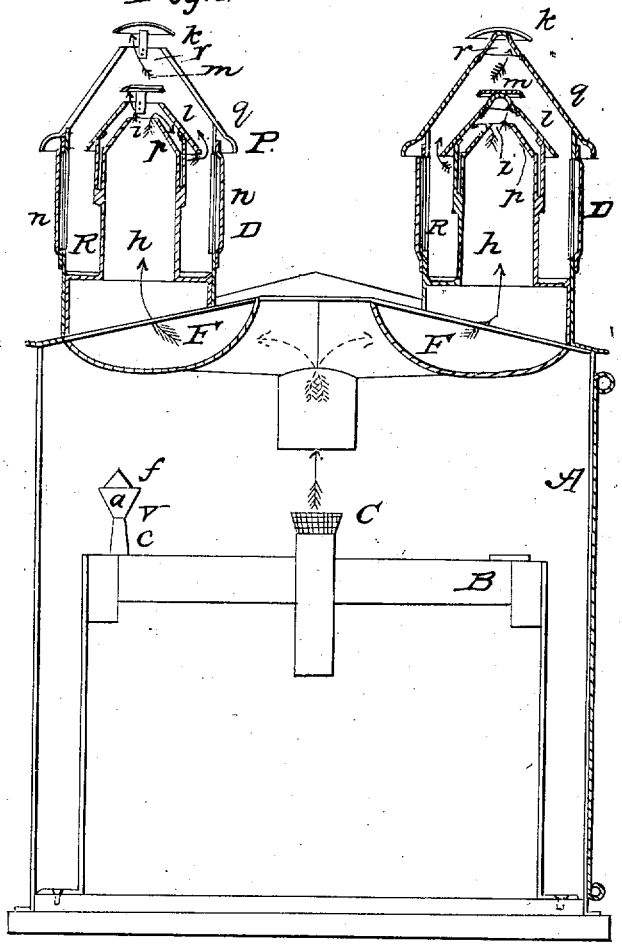
Figure 5:
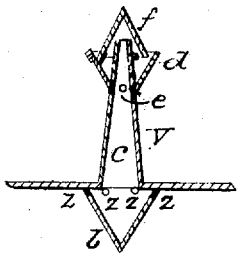
Figure 4:
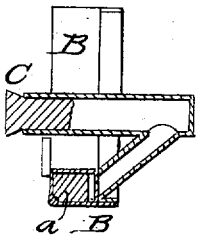
Figure 6:
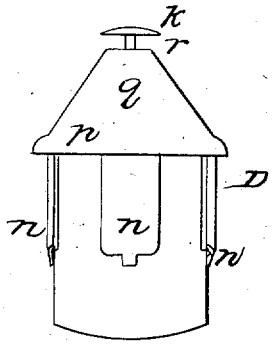
Figure 2:
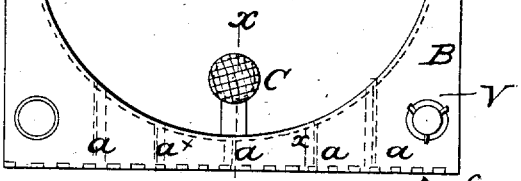
Figure 3:
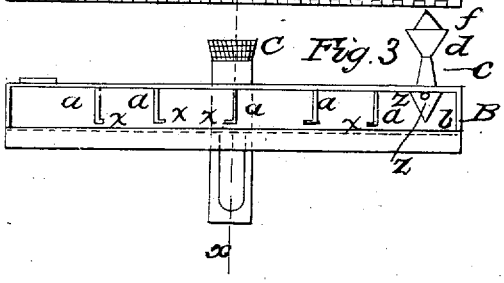

Figure 1 is a vertical section of case through axes of the chimneys. Fig. 2 is a top view of can and burner. Fig. 3 is a rear view of same, showing interior of can. Fig. 4 is a vertical section on line *x x* of Figs. 2 and 3. Fig. 5 is a section of vent, taken through its axis. Fig. 6 is a front elevation of chimney.

Similar letters of reference in the several figures denote the same part of the lamp.

My invention refers to improvements in the can and vent of locomotive-lamps; and it consists, first, in constructing the can with several chambers communicating with each other, substantially as hereinafter to be set forth, for preventing the swash of the fluid in the can and the slopping over incident to the motion of the engine; second, in placing over the vent-tube a conical cap, and around said tube and near its top a funnel communicating with the interior of the vent-tube, also a perforated funnel under the tube, the arrangement being such that, while air is freely admitted to the can, the oil cannot fly out of the vent.

To enable others skilled in the art to make and use my invention, I will proceed to describe the construction and operation of the same.

In the drawings, A is the lamp-case; B, the can, of the ordinary external construction; C, burner, and D the chimneys.

Running across the can, and extending from the top nearly to the bottom of the same, are the partitions *a*, (shown in Figs. 2 and 3,) dividing the can into several chambers in communication with each other.

V is the vent, consisting of the perforated funnel *b* within the can and directly under the top, the tube *c*, perforated at *e*, the funnel *d*, and cap *f*. (See Fig. 5.)

The other portions of the can and case, being well known, will not require particular description.

The operation of my improved lamp is as follows: The partitions *a* prevent the swash, and consequent slopping of the fluid, which takes place in ordinary cans, and by keeping the oil in a quiet state insure regularity of feed and a consequent steadiness of flame. Air enters the can through the tube *c* and perforations *z* of the funnel *b*, while if any of the fluid should be thrown up through the tube it impinges against the cap *f*, and is thrown back into the funnel *d*, and by the apertures *e* in the tube *c* enters said tube, and flows back into the can. Thus the vent, while it furnishes a sufficient supply of air, effectually prevents the exit of the oil from the can.

What I claim as my invention, and desire to secure by Letter Patent, is—

1. Constructing the can B with several compartments in communication with each other, substantially as and for the purpose specified.

2. The combination of the perforated inverted cone *b*, cap *f*, funnel *d*, and perforated tube *c*, constructed, arranged, and operating as hereinbefore set forth, for admitting air to the can and preventing the slopping of oil from the vent.

I. A. WILLIAMS.

Witnesses:
A. J. WILLIAMS,
M. M. JONES.